United States Patent [19]

Humphrey et al.

[11] Patent Number: 5,303,022
[45] Date of Patent: Apr. 12, 1994

[54] LENSOMETER WITH GUIDED LENS MOVEMENT FOR PROGRESSIVE ADDITION LENS

[75] Inventors: William E. Humphrey, Castro Valley; Charles E. Campbell, Berkeley; James E. Sheedy, Oakland, all of Calif.

[73] Assignee: Humphrey Instruments, Inc., San Leandro, Calif.

[21] Appl. No.: 916,243

[22] Filed: Jul. 17, 1992

[51] Int. Cl.$^5$ .............................................. G01B 9/00
[52] U.S. Cl. ...................................... 356/124; 356/127
[58] Field of Search ................................ 356/124–127

[56] References Cited

U.S. PATENT DOCUMENTS

| | | | |
|---|---|---|---|
| 3,981,589 | 9/1976 | Spitzberg | 356/127 |
| 4,070,115 | 1/1978 | Humphrey | 356/125 |
| 4,180,325 | 12/1979 | Humphrey | 356/127 |
| 4,640,596 | 2/1987 | Humphrey | 351/211 |
| 4,730,924 | 3/1988 | Allard et al. | 356/125 |
| 5,100,232 | 3/1992 | Smith et al. | 356/124 |
| 5,173,739 | 12/1992 | Kurachi et al. | 356/124 |

OTHER PUBLICATIONS

"Development of Variable-Focus Lenses and a New Refractor", *Journal of the American Optometric Association*, Apr., 1977.
"A Remote Subjective Refractor Employing Continuously Variable Sphere-Cylinder Corrections", Feb., 1976 article by William E. Humphrey, Ph. D.

*Primary Examiner*—Robert J. Warden
*Assistant Examiner*—Krisanne M. Thornton
*Attorney, Agent, or Firm*—Townsend and Townsend Khourie and Crew

[57] ABSTRACT

A computer indicated lens movement direction protocol is utilized in combination with a lensmeter to designate required movement of lenses with respect to a lensmeter to insure sequential measurement of progressive addition lenses. Lens measurement occurs at four sample points closely spaced on the lens surface. The system uses power variations ($PV_1$ and $PV_2$) at each of the spaced apart lens sampling points to indicate when sampling of the lens occurs in a region of constant spherical power, when sampling of the lens occurs in a region of changing spherical power, and finally when sampling again occurs in a region of constant and increased spherical power. When sampling of the lens occurs in a region of changing power, lens movement is guided along a path of constantly changing sphere utilizing changes in astigmatism measured in the 45°–135° directions ($C_X$). A lens examination protocol is set forth with vector indicators setting forth the vertical direction required for movement as well as both desired left and right movement to maintain the shortest possible path between the respective lens portions.

3 Claims, 3 Drawing Sheets

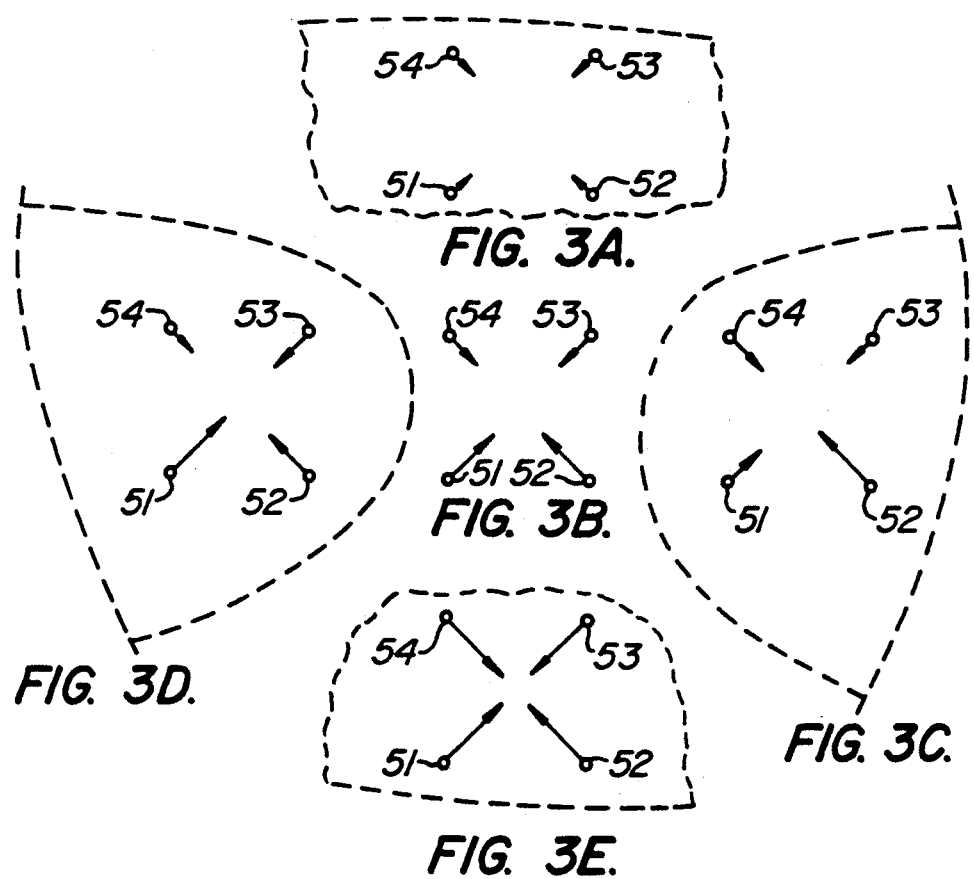

LENSOMETER WITH GUIDED LENS MOVEMENT FOR PROGRESSIVE ADDITION LENS

This invention relates to lensmeters. More particularly, a lensmeter attachment is disclosed for guiding the measurement of a progressive addition lens so that erroneous measurements are not taken with respect to those areas of gradually changing power on the lens.

BACKGROUND OF THE INVENTION

So-called progressive addition lenses are now common. Such lenses hide the spherical addition common to bifocals by having a progressive addition of sphere from a view through distance portion at the top of the lens to view through near viewing or reading portion at the bottom of the lens. These lenses have the aesthetic advantage of hiding the easy to observe optical line boundaries characteristic of traditional bifocals.

A moments reflection upon the normal optical construction for bifocals can help with the understanding of such lenses.

Bifocals typically have an upper segment for distance observation. Relative to a lower segment of such lenses, bifocals have a less positive or more minus power of sphere in the upper segment of such lenses.

At lower segments of the lens, bifocals have more plus or less minus power of sphere. This sphere power difference substitutes for the loss of accommodation that naturally occurs with the aging process. Thus, a person having partially lost or totally lost accommodation can remain relatively relaxed and still read with the aid of the lower spherical add segment of such bifocal lenses.

In normal bifocal lenses, the demarcation between the distant portions of the lenses are regular optical boundaries that have the easy to recognize line border on the lens. An operator of a lensmeter can register the segments utilizing the line boundaries and readily obtain optical measurements of each of the discrete segments of the lens.

The so-called progressive additional lens has the boundaries between the discrete optical zones of the lens hidden by a gradual change of the optical power. This lens does not include the telltale line boundaries between the bifocal portions. The lack of this telltale line makes the difference in the boundaries essentially invisible. One cannot immediately perceive that a person with such glasses is wearing bifocals. Further, the progressive addition lenses allow the wearer to utilize the transition power of the lenses. Thus, where intermediate accommodation is required, the wearer of such lenses can learn to direct his vision at the correct elevation relative to such lenses to achieve accommodation between two extremes.

Unfortunately, when such lenses are measured by a lensmeter—particularly an automated lensmeter—the particular portions of constant power can not be accurately located. Error in the measurement results when the lens is incorrectly placed. Further, and because there are no boundaries to guide measurement, such misplacement is a frequent occurrence.

It is known in the prior art to have a light on a lensmeter to indicate to the operator of the lensmeter when that operator is trying to measure in a so-called "non-toric zone" of a progressive addition lens. Such lights, however, do not tell the operator in which direction lens movement must occur to make an accurate measurement. The best that such lights do is to indicate when the person is in a so-called non toric zone.

The theory behind such indications of non toric zones is set forth in Humphrey U.S. Pat. No. 4,180,325 issued Dec. 25, 1979 entitled Lensmeter with Automated Readout. In this patent, Humphrey (one of the inventors herein) sets forth a mathematical approach for the analysis of toric and non toric lenses. The specific combinations of ray deflection which signal the presence of non-toric lens effects are given there in and defined as;

$PV_1$, $PV_2$, and $C_A$ where PV terms are proportional to components of power variations across the lens surface and $C_A$ is proportional to circular astigmatism.

In the prior art, the so-called non-toric zone presence is signalled by a light that comes on when $(PV_1)^2 + (PV_2)^2 + (C_A)^2$ exceed a predetermined value. Details can be found in the referenced application. Directional information is omitted; required lens position must be found by the operator's movement of the lens without assistance.

SUMMARY OF THE INVENTION

A computer indicated lens movement direction protocol is utilized in combination with a lensmeter to designate required movement of lenses with respect to a lensmeter to insure sequential measurement of progressive lenses. Lens measurement occurs at four sample points closely spaced on the lens surface. The system uses power variations ($PV_1$ and $PV_2$) at each of the spaced apart lens sampling points to indicate when sampling of the lens occurs in a region of constant spherical power, when sampling of the lens occurs in a region of changing spherical power, and finally when sampling again occurs in a region of constant and increased spherical power. When sampling of the lens occurs in a region of changing power, lens movement is centered to the lens umbilicus along a path of constantly changing sphere utilizing changes in astigmatism measured in the 45°-135° directions ($C_x$). A lens examination protocol is set forth with vector indicators setting forth the vertical direction required for movement as well as both desired left and right movement to maintain the shortest possible path between the respective lens portions.

The disclosed measuring sequence assumes that the lens to be measured is placed in alignment to the lensmeter with distance portion disposed to the operator and the near portion disposed towards the body of the lensmeter. Upon initial insertion of the lens, movement to the distance portion of progressive lens is designated by an arrow indicating lens movement towards the distance portion of the lens. The indication for such movement remains until registration of the lens occurs to the distance lens portion having constant sphere. Thereafter, a measurement is taken of the distance lens portion with the value of sphere and astigmatism being committed to system memory. Once this measurement is taken, downward lens movement is indicated to and toward near vision portions of the lens having higher positive power. Such downward lens movement is directed so long as incremental changing sphere is detected.

Downward movement is confined to a path of constantly changing sphere known as the "umbilicus" of a progressive addition lens. Where the operator varies in an essentially orthogonal direction from the path of constantly changing sphere, additional 45°-135° astigmatism ($C_x$) is introduced to the lensmeter measured power of the lens. These introduced components of 45°–135° astigmatism ($C_x$) together with the sign of the introduced power of 45°–135° astigmatism are utilized to indicate corrective left and right lens movement from the desired path along the lens umbilicus. Downward movement on the progressive addition lens occurs limited to this umbilicus path. This downward movement continues until a lower area of substantially the same component of originally measured astigmatism together with and increased but constant spherical component is located. Thereafter, a second measurement is taken and recorded to complete the measurement of the bifocal system. Definitions of $C_x$ and $C_+$ can be found in at least Humphrey U.S. Pat. No. 4,180,325 entitled Lensmeter with Automated Readout.

The lens movement protocol rejects progressive addition lenses that are not oriented vertically with the near reading portion towards the lensmeter and the distant field portion disposed to the operator. This assures uniformity of mounting of the lenses with respect to eye frames as well as designating the correct vertical axis of the lens system. Consequently, system of measuring such lenses with substantially reduced propensity for measurement error is disclosed.

BRIEF DESCRIPTION OF THE DRAWINGS

FIG. 3 is an outline of a progressive addition lens with various points of measurement indicated at portions 3A–3E with vectors indicating the various powers detected at specific points designated on the lens of FIG. 2 with;

FIG. 3A illustrating the vector measurement of a lens at the upper distance portion of the lens;

FIG. 3B illustrating the vector measurement of a lens as centered movement along the umbilicus occurs with the sphere power changing at the respective lens portions;

FIG. 3C illustrates the vector measurement where excursion to the right of the umbilicus of FIG. 2 occurs;

FIG. 3D illustrates the vector measurement where excursion to the left of the umbilicus of FIG. 2 occurs; and, FIG. 3E illustrates the vector measurement where the lower near reading portion with its increased spherical power has been located.

DESCRIPTION OF THE PREFERRED EMBODIMENT

Figure 1:
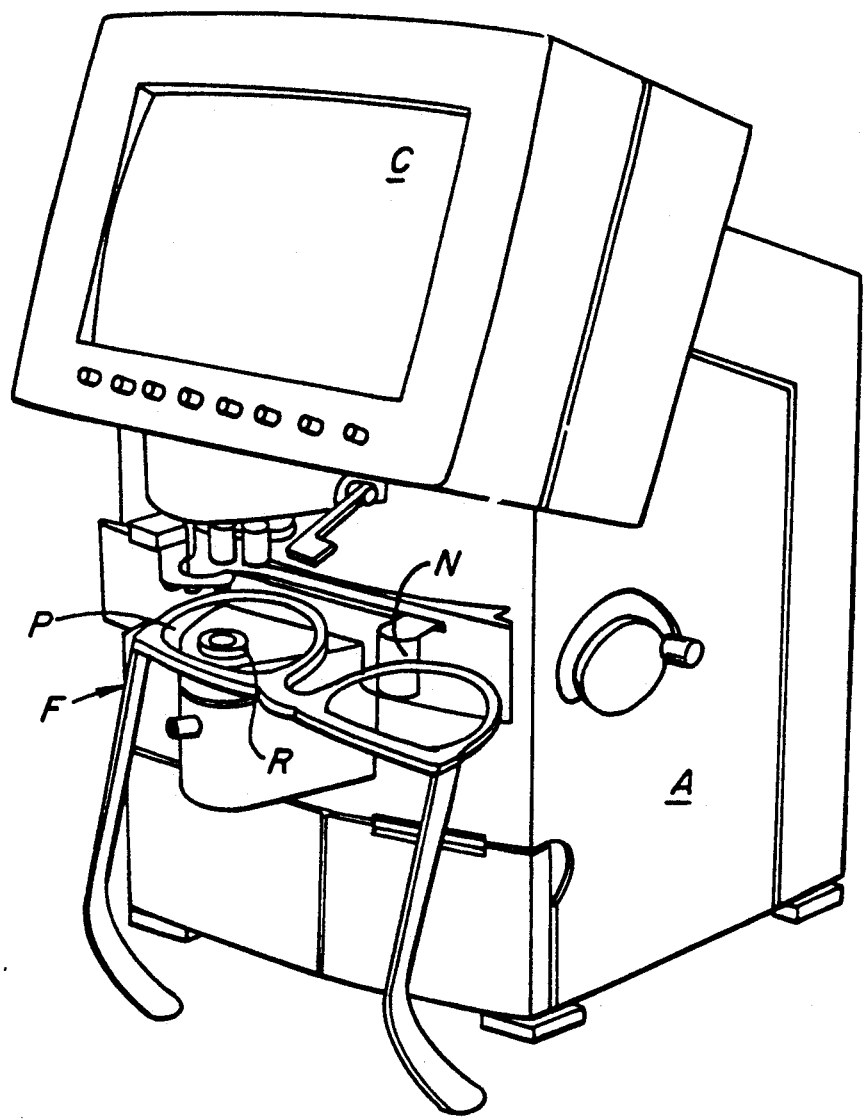
FIG. 1 is a perspective view of a lensmeter with a progressive addition lens being mounted to eyeglass frames initially addressed to the lensmeter for measurement.

Referring to FIG. 1, an automated lensmeter A equipped with the invention herein is illustrated. The lensmeter A includes read head R having four sampling apertures for the examination of lenses (these apertures being schematically shown in FIG. 3A–33). The alignment and sample deflections of these sampling apertures will be set forth in vector format in the following description of FIG. 3A–3E.

Figure 1A:
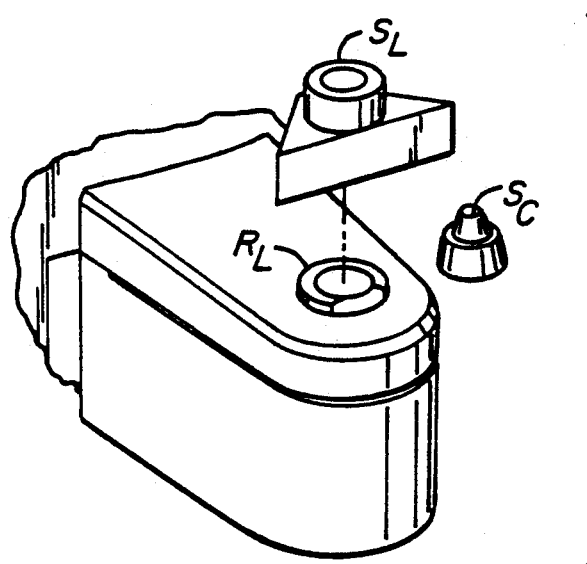
FIG. 1A is a detail of the lens interrogating portion of the lensmeter of FIG. 1.

In the detail of FIG. 1A, lens $S_L$ for the examination of regular lenses and lens $S_C$ for the examination of contact lenses are shown in an expanded detail of the interrogation head of the lensmeter. Since this application is applicable to regular lenses only, only lens $S_L$ is of concern.

Additionally, lensmeter A includes a screen C— which is typically computer actuated through a built-in computer within the system. Frames F containing progressive addition lens P is shown addressed to a nose bridge N on the lensmeter A. It is the protocol and generation of guidance information for measuring the progressive addition lens P that forms the subject matter of this invention.

Figure 2:
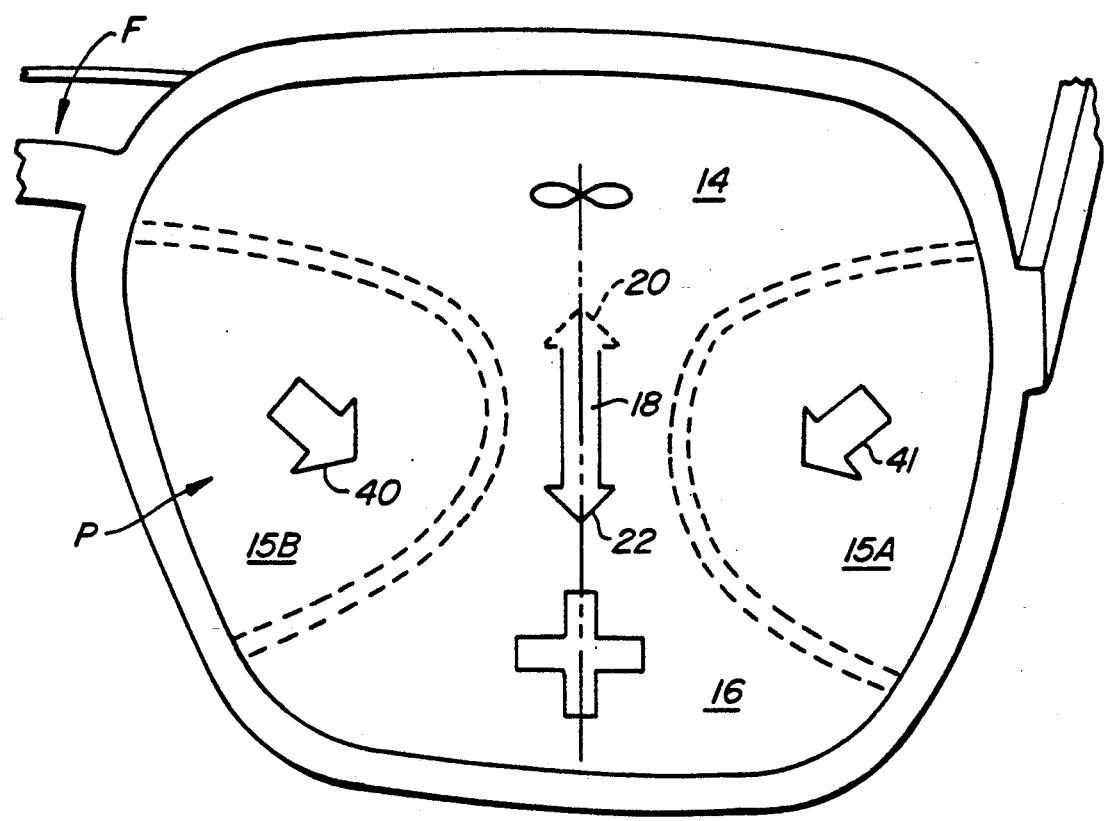
FIG. 2 is a view of a typical progressive addition lens indicating the various zones of the lens and tracing the so-called umbilicus between the upper distance portion of the lens and the lower near vision portion of the lens, the lens here shown with the computer displayed icons superimposed on the lens just as they appear on the computer graphics of this invention.

Referring to FIG. 2, a progressive addition lens P is illustrated. Lens P includes a distance portion 14, a near vision portion 16, and two portions 15A and 15B having essentially non toric surfaces. The so-called lens umbilicus 18 is illustrated as being a line between portions 14, 16 where power is changing without introducing appreciable change in astigmatism.

It will be noted that the upper portion of lens P at distance portion 14 includes an infinity sign $\infty$. Likewise, the lower near distance portion of the lens includes a plus sign $+$. These respective signs are utilized in a display to indicate when measurements should be taken. This display includes the outline of a lens P as shown in FIG. 2 with this outline being displayed on screen C of lensmeter A.

Regarding such a screen display, it is necessary to display on screen C of lensmeter A respective arrows designating the desired direction of lens movement. Accordingly, and assuming that samples are being taken through the umbilicus 18, where upward movement is desired, arrow 20 is actuated (broken lines); likewise, and where downward movement is desired, arrow 22 is actuated (solid lines).

Additionally, it will be understood that registration to the umbilicus of lens P will often not occur. In this case, the operator of the lensmeter will be given directional arrows. Where lens P is being moved downward, arrows 40, 41 will be actuated for respective left and right movement.

Having set forth a description of the lensmeter, attention will now be devoted to the typical vector deflections to be expected in any portion of a measured lens P. This will be demonstrated in a vector format utilizing the sampling apertures. Thereafter, the program which effects the movement of this protocol will be outlined. Finally, and filed as an appendix hereto applicant will lodge a program sufficient to indicate the desired movement.

Referring to FIG. 3A, and assuming that there is no resident astigmatism, the vector format of examination through distance portion 14 is illustrated. Positive spherical power of a reduced quantity suitable for distance vision is symbolized by small vectors directed radially inward from each of the examination points 51–54.

Referring to FIG. 3E, and again assuming that there is no resident astigmatism, the vector format of examination through near vision portion 16 is illustrated. Positive spherical power of an increased quantity suitable for accommodated near vision is symbolized by large vectors directed radially inward from each of the examination points 51–54.

Comparing the respective vector fields gives the expected result. Smaller sphere is found in FIG. 3A while large sphere is found in FIG. 3E.

Referring to FIG. 3B, and assuming that there is no resident astigmatism, the vector format of examination through a point half way between distance portion 14 and near vision portion 16 is illustrated. Positive spherical power of a reduced lesser quantity is found at upper sampling points 53, 54. Positive spherical power of an increased quantity is found at lower sampling points 51, 52. It will be realized that the differential value between points 53, 54 above and 51, 52 below indicates that one is in the transition zones between the respective portions 14, 16. At the same time, because the vectors are equal at 53, 54 in the case of the upper apertures and 51, 52 in the lower apertures indicates that the measurement is being taken on or immediately adjacent to the umbilicus.

Referring to the FIGS. 3C and 3D, the situation becomes more complicated. First, it will be understood that the measurements here shown are taken relatively closer to the umbilicus 18 than the actual overlay of these respective Figures suggests; the proximity here shown is for ease of understanding. Secondly, the respective sampling apertures of each sampling pair—that is 51, 52 and 53, 54—have differing lengths. These respective lengths are a function of the cross astigmatism $C_x$ introduced as a function of displacement. As can be seen in the case of FIG. 3C, vectors from 52, 53 exceed the respective vectors 51, 54. Likewise, and as can be seen in the case of FIG. 3D, vectors from 52, 53 do not exceed the respective vectors 51, 54. This is directly a function of the cross astigmatism $C_x$ added as a result of the displacement. It can also be intuitively sensed from the presented diagrams that the vector format will include sign (ie. plus [+] and minus [−]) to enable direction to be sensed during measurement with respect to the lens.

Having explained this much, the program sequence can now be explained.

First it will be understood, that the vector formats previously illustrated can be broken down. Second, it is known to break down these respective formats in the form:

$$S_{EQ} + C_+ + C_x + PV_1 + PV_2 + C_a$$

where $S_{EQ}$ is spherical equivalent;
$C_+$ is 0°–90° astigmatism;
$C_x$ is 45°–135° astigmatism;
$PV_1$ and $PV_2$ are proportional to power variations found across the lens surface indicating generally non toric regions; and,
$C_a$ is so-called circular astigmatism.

When $PV_1 - PV_2 \geq 0.01$ (or other chosen threshold), this indicates that power is changing. No reading is taken during this interval. Assuming that there is no displacement to either side of the lens illustrated in FIG. 2, location in the corridor is assumed overlying umbilicus 18. Initially, movement upwardly will be signaled by arrow 20.

The operator will thereafter move lens P upward to obtain distant power.

When $PV_1 - PV_2 < 0.01$ (or other chosen threshold), the lens will have reached a stable power region. A reading can thereafter be taken. The distant power will thereafter be measured and stored.

The reader will realize at this juncture, in the examples given, the presence of astigmatism in the prescription will be ignored. Further, it has been set forth as a part of this invention that it is the change in cross astigmatism that is the telltale indication of displacement to one side or the other side of umbilicus 18. It will therefore be understood that hereafter when cross astigmatism $C_x$ is referred to arising from lens displacement, it has no reference to that cross astigmatism found in the original prescription.

Then the screen indicates to move downward by displaying arrow 22 to acquire the near or accommodation power of portion 16.

During this movement, $PV_1 - PV_2 > 0.01$ (or the chosen threshold). At the end of this movement, $PV_1 - PV_2 < 0.01$, the condition for the taking of the near or accommodative portion will be present.

Utilizing the exemplary threshold and while in the corridor and heading towards near prescription, when $PV_1 - PV_2 \geq 0.01$ and $C_x \geq 0.37$ (again an exemplary threshold), the sign of this value will drive the direction of a sideways arrows 40, 41 to indicate the direction in which the lens must be moved by the operator in order to proceed to the center of the corridor of umbilicus 18.

In the case of the lower portion 16 measurement, it is important to note the condition that a so-called "add" has occurred for the accommodative lower portion 18 of the lens. Therefore (and continuing to use the exemplary thresholds of this example) when $PV_1 - PV_2$ becomes $<0.01$, and $S_{EQ}$ is $\geq 0.50$ and $C_x$ is $\leq 0.37$, the screen C indicates arrival in the near portion of the lens at portion 16 and the near measurement is made.

In this specification, we have referred to moving towards portions of the progressive addition lenses having increased spherical power. Those having skill in the optical art will realize that in making this statement we are referring to a continuum of spherical power. This simply means that the near portion of the progressive addition lenses is always positively displaced with respect to the distance portion. It will be understood that where the distance portion is negative, the near portion could as well be negative—although (more) positively displaced with respect to the distance portion.

What is claimed is:

1. A process of measuring a progressive addition lens having an upper portion with reduced positive sphere for distance vision and a lower portion with increased positive sphere for near vision and a zone of gradually changing sphere between said portions, said process of measuring comprising the steps of:

providing a lensmeter for measuring lenses having at least first and second pairs of sampling apertures with each of said apertures resolving the deflection of light passing through a lens to be tested at said sampling apertures;

placing a lens in said lensmeter at said sampling apertures;

determining the power variation of light at said first pair of sampling apertures for a first deflection comparison;

determining the power variation of light at said second pair of sampling apertures for a second deflection comparison;

comparing said deflection comparisons; and, where said deflection comparisons are not equal to a preselected value, directing movement of said lens substantially towards upper lens portions having reduced positive sphere; and, where said deflection comparisons are substantially equal, recording lens spherical power and cylinder measurement in a first measurement.

2. The process of claim 1 and including the steps of:

after recording said first measurement, moving said lens in the direction of said lower portion with increased positive sphere;

where said deflection comparisons are not equal to a preselected value, continuing movement of said lens towards said lower portion with increased positive sphere, and where said deflections become equal, recording said lens spherical power and cylinder provided increased spherical power is recorded relative to said first measurement.

3. The process of claim 1 and including the steps of:

during said movements of said lens, measuring change in diagonal cross cylinder and;

where said change in diagonal cross cylinder has a first vector sign, moving said lens laterally in a first direction to eliminate said change in cross cylinder vector sign; and, where said change in diagonal cross cylinder has a second vector sign, moving said lens laterally in a second and opposite direction to eliminate said change in cross cylinder vector sign.

* * * * *